E. L. BUSCHMAN.
AUTOMATIC BAG FILLING AND WEIGHING MACHINE.
APPLICATION FILED APR. 19, 1910.

993,751.

Patented May 30, 1911.

2 SHEETS—SHEET 1.

Witnesses:
Oscar A. Berry
Robert F. Awbrey

Inventor
Edward L. Buschman
By his Attorney
Willis Fowler

E. L. BUSCHMAN.
AUTOMATIC BAG FILLING AND WEIGHING MACHINE.
APPLICATION FILED APR. 19, 1910.
993,751.
Patented May 30, 1911.
2 SHEETS—SHEET 2.
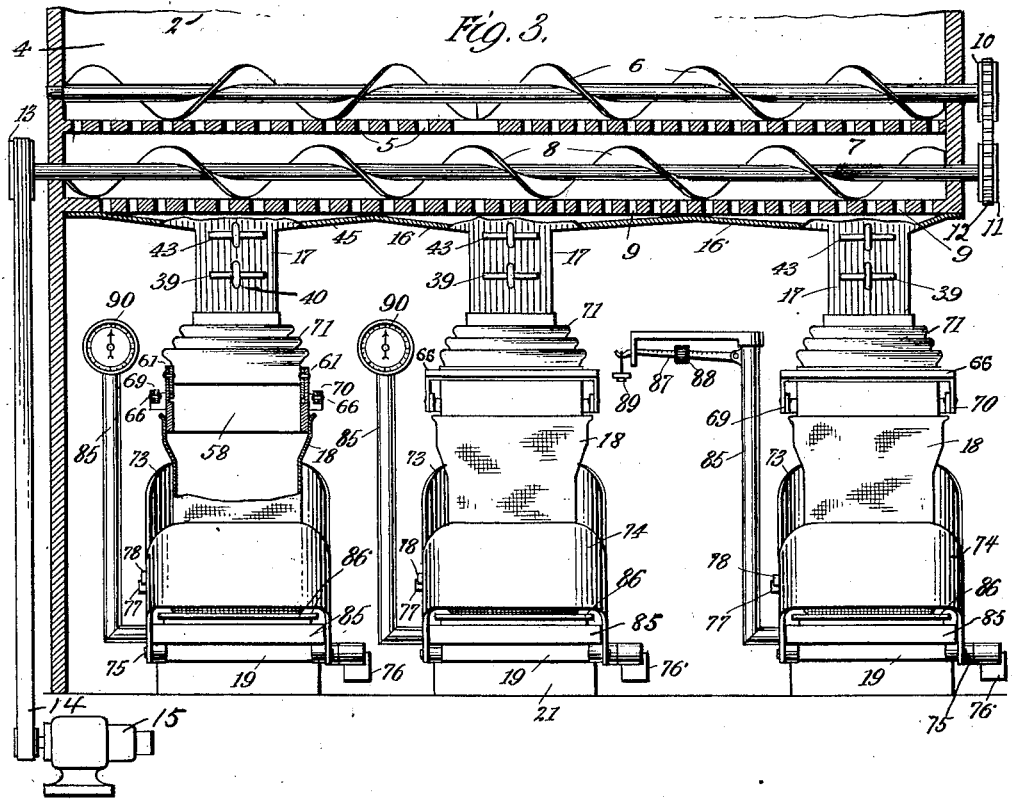
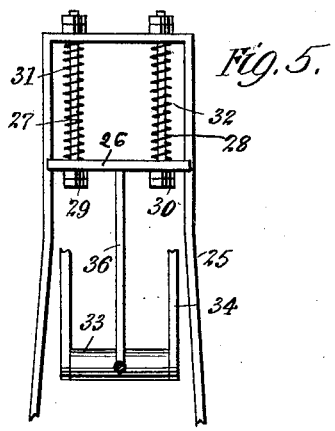
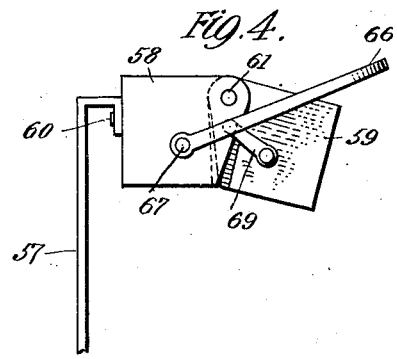
Witnesses:
Oscar B. Berry
Robert F. Henry
Inventor
Edward L. Buschman
By his Attorney
Willis Fowler

UNITED STATES PATENT OFFICE.

EDWARD L. BUSCHMAN, OF EAST ORANGE, NEW JERSEY.

AUTOMATIC BAG FILLING AND WEIGHING MACHINE.

993,751.  Specification of Letters Patent.  Patented May 30, 1911.

Application filed April 19, 1910. Serial No. 556,370.

*To all whom it may concern:*

Be it known that I, EDWARD L. BUSCHMAN, a citizen of the United States, residing in East Orange, Essex county, State of New Jersey, have invented certain new and useful Improvements in Automatic Bag Filling and Weighing Machines, of which the following is such a full, clear, and exact description as will enable any one skilled in the art to which it appertains to make and use the same, reference being had to the accompanying drawings, forming part of this specification.

My invention relates to a machine for automatically filling bags and weighing the material placed in the bags so that as soon as a predetermined final weight of material is reached, the supply of material to the bag is automatically cut off.

The principal objects of the invention are to provide a machine of this class in which the predetermined final weight which is to be deposited in each bag may be very closely approximated in each instance so that practically a uniform weight of material may finally be deposited in each bag without the usual variation which is found in machines of this class, which heretofore have been in operation, and to inform the operator by means of another scale of the exact weight of the material in the bag at any time during the filling operation as well as when the bag is filled and when the supply of material has been shut off.

The invention further seeks to provide by means of an ordinary weighing scale, an absolute check for the operator in knowing precisely the amount of the material contained in the bag when it is filled, and such operation being automatic and without any manipulation on the part of the operator.

With these and other objects in view, my invention consists in the various novel and peculiar combinations and arrangements of the several different parts of the apparatus, all as hereinafter fully set forth and then pointed out in the claims.

Figure 1:
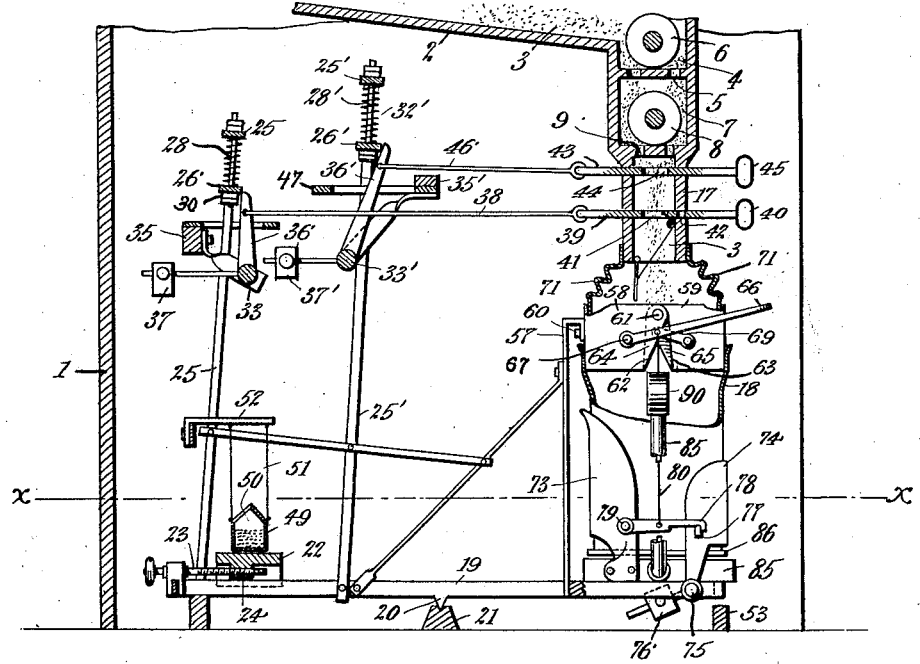
Figure 2:
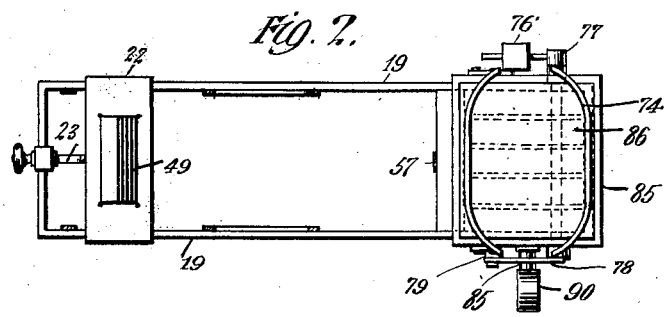

I have illustrated a type of my invention in the accompanying drawings, wherein:

Figure 1 is a vertical sectional view of my improved machine for filling bags and weighing the material so filled in the same, the operative parts being shown in the operation of filling the bag. Fig. 2 is a horizontal sectional view of the machine shown in Fig. 1, the plane of the section being indicated on line *x—x*, Fig. 1, and with the bag removed. Fig. 3 is a front view of a machine showing three of the bag filling and weighing devices, the upper part of the feeding mechanism being shown in vertical section. Fig. 4 is a detached view with the upper part of one of the movable stops for keeping the feed valve normally open. Fig. 5 is a detached view of the latch tripping device shown in contracted position.

Referring to the drawings in which like numbers of reference designate like parts throughout, 1 indicates the frame-work in which the machine is mounted, 2 is the feed hopper which supplies the material 3 to the trough-shaped compartment 4 having perforations 5 in the bottom thereof and in which compartment operates a spiral conveyer 6 and which serves to move the material in the compartment so as to feed it uniformly through the perforations 5 in the bottom thereof and from which it passes into a similar compartment 7 likewise having a spiral conveyer 8 therein which in turn feeds the material through the perforations 9 in the bottom of said compartment 7. The shafts of the spiral conveyers are geared together by sprocket wheels 10 and 11, respectively, and a chain 12 passing around said sprockets. The shaft of the lower conveyer 7 has a pulley 13 around which passes a driving belt 14 which is actuated by a suitable motor 15. The material 3 passing through the openings 9 in the bottom compartment 7 is received by the upper expanded end 16 of the feed chute 17 through which the material is passed on its way to the bag 18 which is placed some little distance beneath it.

Beneath each feed chute 17 is mounted a tilting balance frame or lever 19 having a knife edge 20 which rests on the bed-piece 21, and this frame acts as an ordinary scale lever, it being provided with a sliding counterweight 22, which is provided with a feed screw 23 which is mounted on the lever and has its threaded end passing through a threaded socket 24 in the counterweight 22. By means of the screw 23, the weight 22 may be slid inwardly or outwardly on the lever relatively to the fulcrum 20 so as to set the scale to weigh a predetermined amount when the same is placed upon the outer end of the lever 19. The inner end of the scale-lever 19 carries an upright frame 25 in which is mounted a vertically sliding stop 26 (see Figs 1 and 5), the ends of which slide on the frame and which is provided with a pair of guide-rods 27, 28, which depend from the upper end of the frame, pass through perforations in the sliding stop 26 and are provided at their lower ends with fixed abutments 29, 30, respectively, for limiting the lower limit of movement of the slide 26. Springs 31, 32, are placed around the guide-rods 27, 28, respectively, and bear with the other ends against the sliding stop 26 so as to normally keep the same depressed to its lowest limit of movement. A rock-shaft 33 mounted in bearings 34 secured to a fixed cross piece 35 carries an upwardly projecting finger 36, and the rock-shaft is provided with a counterweight 37 which tends to swing the finger backwardly and throw it against the cross-piece 35, but this movement is restrained by means of the stop 26 which engages the back of the finger 36, as shown in Fig. 1, the normal position of these parts. The finger 36 is connected by means of a horizontal link 38 with a sliding gate or valve 39 mounted across the feed-chute 17, the outer end of the valve or gate 39 being provided with a handle 40 for drawing the valve outwardly and setting it in open position. The valve 39 is provided with a large opening 41 which normally is set in the passage of the chute 17 and a smaller opening 42, which after the valve is shifted from its normal position is brought within the passageway of the chute 17, in place of the larger opening 41. It will now be seen that as the supporting frame 25 which controls the stop 26 of the valve 39, is located at the extreme rear end of the scale lever 19, that it has a greater range of vertical movement than if located nearer the fulcrum point 20 of the lever. As soon as the scale lever 19, is tipped out of horizontal position, the rear end moving upwardly but a slight way will carry the stop 26 upwardly away from the engaging finger 36 and permit the counterweight 37 of the rock-shaft 33 to swing the finger inwardly (toward the left in Fig. 1), and thereby start to close the valve 39 and in so doing to move the large opening 41 out of the chute 17 and present the smaller opening 42 to the passageway of the chute. This checks the flow of material to the bag, just before the final predetermined weight is reached and for a purpose hereinbefore referred to.

The feed chute 17 is also provided with a cut-off valve 43 having a single opening 44 which is normally in the path of the passageway of the chute and this valve is also provided with a handle 45 located to the outside of the chute for drawing the valve outwardly in open position and resetting it after it is closed and when the feeding is again to take place. The valve 43 is placed above the valve 39 and is not operated until after the operation of the valve 39. This valve is connected by means of a link 46 with a similar locking and releasing device as described in connection with the valve 39, such parts being marked with the reference numerals 25' to 37', which correspond with the numerals 25 to 37 of the mechanism already described. In this construction, however, the cross-piece 35' being forward of the locking finger 36', the latter is made to rest against a fixed part 47 when the stop 26' is carried upwardly so as to release the finger. As the stop carrying structure 25' is located very much nearer the fulcrum point 20 of the scale than the stop carrier 25, the former (25') has a shorter range of vertical movement than the latter and its stop 26' is adjusted relatively to the finger 36', so that the latter cannot be released until shortly after the release of the stop finger 36 of the retarding valve 39, in order that some little time may elapse between the operation of the two valves. When the movement of the scale is sufficient to cause the stop 26' to move above its finger 36', the cut-off valve 43 is then thrown into operation and the opening 44 being drawn entirely out of the chute 17, the latter is thereby completely closed against the supply of further material to the bag.

Upon the forward end of the scale lever 19 is mounted an ordinary platform scale 85 on the platform 86 of which is placed the bag 18 which is to be filled. This scale 85 may be any well known form of weighing scale having the usual indicator for telling the weight placed upon the scale and in Fig. 3, at the right hand side, I show an ordinary platform scale having the usual scale beam 87 with a sliding weight 88 and a weight-holder 89, while at the left hand side of the figure, I show an ordinary platform scale having a dial 90 with the usual indicator-hand thereon for automatically indicating the weight on the scale. This latter form of the platform scale is also shown in Fig. 2.

The scale lever 19 being set to weigh say the final amount of ninety-five pounds in the bag 18, the counterweight 22 is adjusted so that the scale lever 19 will tip at say about 90 pounds and as its rear end rises, it will pick up the auxiliary counterweight 49, which consists in a small box containing sand 50 or other suitable material which can be added to or subtracted from and which is suspended by means of cords 51 from a support 52. As this auxiliary counterweight 49 is picked up by the scale lever 19, (it being directly added to the counterweight 22), the movement of the scale lever 19 is suddenly checked but by this time it has tipped sufficiently to elevate the stop 26 above the finger 36 and thereby permit the latter to be thrown backwardly and to operate the retarding valve 39 so as to move the large opening 41 thereof out of the chute and bring the smaller opening 42 into the chute. Under this condition, the supply of material 3 continues but it is then passed through a much smaller opening 42, and this reduced stream of material thus being supplied is kept up until five pounds more of material is added to that in the bag to make up the final predetermined weight of ninety-five pounds. As soon as this final weight is reached, it overcomes the added weight of the auxiliary counterweight 49 and causes the scale lever 19 to tip into its final position where it comes to rest on the support 53 arranged beneath its outer end. This action at once closes the cut-off valve 43 by raising the stop 26' away from the locking finger 36' and permitting the latter to draw the valve 43 rearwardly into closed position. Each of the valves may be reset by grasping the handles 40 and 45, respectively, thereof and drawing them outwardly, in which movement the fingers 36 and 36', which then lie to the rear of the stops 26 and 26', respectively, will snap under the stops by virtue of their yielding upwardly, the end of each finger being sloped in order to permit of its being snapped under its stop.

The important advantage of reducing the size of the stream of material being supplied to the valve, just before the final weight is reached, is seen from the fact that a much less quantity of the material is in the air between the valve and the bag, than if the full size stream of material was flowing at the time the cut-off is effected. By thus restricting the flow of material and finally shutting it off, I am enabled to minimize the overweight or underweight of material, which is an important feature in machines of this class.

At the front end of the scale lever 19 is arranged a support 57 for the bag-holder which comprises two curved pieces 58, 59, the former being made fast at 60 to the support 57, while the latter is pivoted at 61 to the fixed member 58. These two curved members are arranged horizontally with the concave portions toward each other so as to form a suitably shaped holder, as indicated in the plan view in Fig. 5, and they are of considerable depth so as to provide a tubular structure for fitting in the mouth of the bag, as indicated in Fig. 1. The abutting ends of the bag-holder members 58 and 59 are made oblique as indicated at 62 and 63, respectively, and are countersunk at 64 and 65, respectively, so as to fit over each and form a flush joint, as indicated in the drawings. The members 58 and 59 have their pivotal points 61 near the upper edge thereof so that when the swinging member 59 is swung outwardly and upwardly from the position shown in Fig. 4 into that shown in Fig. 1, the members are expanded relatively to each other and when the member 59 is swung downwardly the parts are contracted. In this way by inserting the contracted members in the mouth of the bag 18 and then expanding the members, the bag will be distended at its mouth and held sufficiently taut so as to keep it straightened out and in place during the filling process, as indicated in Figs. 1 and 3. A U-shaped operating lever 66 is pivoted by its respective ends to the fixed bag-holder member 58 at the points 67 and 68, respectively, so that the lever extends around in front of the bag-holder in a convenient position to be operated by hand at a desired time. Links 69 and 70 are pivoted between the respective sides of the movable bag-holder member 59 and the hand operating lever 66 so as to form a toggle joint therewith, as indicated in Figs. 1, 4 and 6. By forcing the lever 66 downwardly, the toggle on each side of the holder is made to expand the bag-holder and to maintain it in such expanded position. When it is desired to release the bag from the holder, the lever 66 is moved upwardly thereby raising the toggle-joint and permitting the holder to collapse.

The tubular flexible connection 71 is arranged between the lower end of the feed-chute 17 and the upper end of the bag-holder in order to prevent the escape of any of the material and also to keep the dust of the material within the machine. This connection 71 is made flexible and expansible, somewhat like an accordion, in order to permit the free movement of the bag-holder which moves in response to the movement of the scale.

Upon the upper side of the scale lever 19 is fixed a curved guard or part 73 which extends up almost to the bag-holder and against which the side of the bag bears while being filled. At the outer end of the scale 19 and opposite to the fixed part 73 is a similar part 74 which is pivoted to the scale beam at 75 and is provided with a counterweight 76 which tends to keep the part 74 substantially in vertical position when it is once brought into vertical position, as indicated in Fig. 1. This hinged guard 74 may be tipped outwardly so as to permit the bag 18 to be placed in position on the end of the scale and against the guard 73, after which it is tipped up into vertical position, shown in Fig. 1, and the bag is then centered or positioned directly beneath the bag-holder and the supply-chute 17. In order to retain the movable guard 74 in closed position against the side of the bag, I provide a locking device comprising a lug 77 fixed on the guard and a latch 78 pivoted at 79 to the fixed guard 73. This latch 78 is connected by a pull cord 80 with the bag-holder operating lever 66, in such a manner that when the bag-holder lever 66 is raised to release the bag, the pull cord 80 draws up the latch 78 and releases the pivoted guard 74, which may then be tipped outwardly preparatory to removing the filled bag 18.

From the foregoing description, it will be seen that at all times during the filling operation of the bag, the weighing scale 85 indicates, at the moment, the precise weight of the contents of the material in the bag and that finally when the predetermined weight is reached and the scale lever 19 is operated to cut off the flow of material, which may have delivered a little under or something over the predetermined amount to the bag, the weighing scale 85 will accurately inform the operator of the actual weight of the contents in the bag after the flow of material has been completely shut off. In this way, the operator is kept informed as to the accuracy of the operation of the machine and he knows absolutely whether the filled bags taken from the machine are substantially of the predetermined weight and having this information, he may at once mark upon the bag the precise weight of its contents as indicated by the weighing scale 85. This feature I consider as having the most important advantages in this class of machines as it enables the operator to know with the greatest possible accuracy whether or not the goods taken from the machines are up to the full weight.

Certain parts of the apparatus herein set forth are not claimed herein as the same forms the subject matter of a pending application of mine filed December 9th, 1908, Serial No. 466,645.

I wish to be understood as not limiting my invention to the particular construction of the parts as herein set forth, as various modifications may be made in the different parts without, however, departing from the spirit of my invention.

Having thus described my invention what I claim and desire to secure by Letters Patent is:

1. In an automatic bag filling and weighing machine, the combination with means for feeding material to the bag and mechanism for controlling the same, a weighing scale adapted to be set to move or tilt at a predetermined weight and operatively connected with and actuating said feed controlling mechanism to cut off the feed when the final predetermined weight of material has been deposited in the bag, a second weighing scale adapted to receive and support the bag to be filled and mounted upon said first mentioned scale but independent thereof and also of the said feed controlling mechanism, the said second scale having an indicator by which the exact weight of the contents of the bag is displayed, whereby said second scale may be used as a check on said first mentioned scale by the operator of the machine.

2. In a bag filling and weighing machine, the combination with means for feeding material to the bag, and tending normally to cut off the flow of material, means for locking said mechanism in open position, a tilting lever or scale, a second weighing scale mounted on said tilting lever and adapted to receive the bag to be filled and to indicate the amount of material deposited in the bag, said locking means of the feed mechanism being operatively connected with and actuated by said tilting lever or scale.

3. In a bag filling and weighing machine, the combination with means for feeding material to the bag, a set of devices acting in turn first to reduce the feeding of material to the bag and to finally cut off the feed and each of said devices tending normally to move into closed position, means for locking each of said devices in open position, a tilting lever or scale, a second weighing scale mounted on said tilting lever and adapted to receive the bag to be filled and to indicate the amount of material deposited in the bag, said locking devices of the feeding means being operatively connected with and actuated by said tilting scale or lever.

4. In a bag filling and weighing machine, the combination with means for feeding material to the bag, mechanism for controlling the feeding material to the bag and acting to first reduce the amount of feed and finally to cut it off, a tilting frame or lever adapted to be set to move through a certain distance under a predetermined weight and then to move into its final position under an increase in the weight and being operatively connected with and actuating said feed controlling mechanism, and a weighing scale mounted upon said tilting frame or lever and adapted to receive and support the bag to be filled and to weigh its contents.

In testimony whereof, I have hereunto set my hand in the presence of the two subscribing witnesses.

EDWARD L. BUSCHMAN.

Witnesses:
 ROBERT F. HENRY.
 WILLIS FOWLER.